United States Patent [19]

Dallavalle et al.

[11] Patent Number: 4,814,577
[45] Date of Patent: Mar. 21, 1989

[54] CONTROL CIRCUIT IN PLASMA ARC CUTTING AND WELDING EQUIPMENT DESIGNED FOR TRANSFERRED ARC OPERATION

[75] Inventors: Silvano Dallavalle, Castel S.Pietro; Raffaele Ansaloni, S.Lazzaro di Savena, both of Italy

[73] Assignee: Cebora S.p.A., Italy

[21] Appl. No.: 18,347

[22] Filed: Feb. 24, 1987

[30] Foreign Application Priority Data

Jun. 27, 1986 [IT] Italy ................. 3450 A/86

[51] Int. Cl.$^4$ ............................... B23K 9/00
[52] U.S. Cl. .................. 219/121.57; 219/121.54; 219/121.5; 219/121.39; 219/130.4
[58] Field of Search .............. 219/121 PT, 121 PU, 121 PW, 130.21, 121 PM, 74, 75, 130.4, 121 PQ; 313/231.31, 231.41, 231.51

[56] References Cited

U.S. PATENT DOCUMENTS

| | | | |
|---|---|---|---|
| 3,344,256 | 9/1967 | Anderson | 219/121 PW |
| 3,775,392 | 3/1968 | Brzozowski et al. | 219/121 PW |
| 3,809,850 | 5/1974 | Saenger, Jr. | 219/121 PW |
| 3,832,513 | 8/1974 | Klasson | 219/121 PP |
| 3,858,072 | 12/1974 | Dembovsky | 219/121 PP |
| 3,997,756 | 12/1976 | Bykhovsky et al. | 219/121 PW |
| 4,125,754 | 11/1978 | Wasserman et al. | 219/121 PP |
| 4,481,636 | 11/1984 | Curr et al. | 219/121 PP |
| 4,678,888 | 7/1987 | Camacho et al. | 219/121 PW |

FOREIGN PATENT DOCUMENTS

| | | |
|---|---|---|
| 0014613 | 8/1980 | European Pat. Off. |
| 0159256 | 10/1985 | European Pat. Off. |
| 0136564 | 10/1980 | Japan ............... 219/121 PW |

Primary Examiner—M. H. Paschall
Attorney, Agent, or Firm—Darby & Darby

[57] ABSTRACT

The circuit comprises a transformer and a rectifier, and is used in conjunction with a torch the electrode of which is wired to one of the output terminals of the rectifier; the nozzle is connected to the remaining terminal by way of a resistor. A comparator monitors passage of the power stage from stand-by to normal non-transferred arc operation, and triggers switch-in of the ground cable by way of which the work is connected to the relative terminal of the rectifier, only after an arc has first been struck between the electrode and the nozzle.

3 Claims, 2 Drawing Sheets

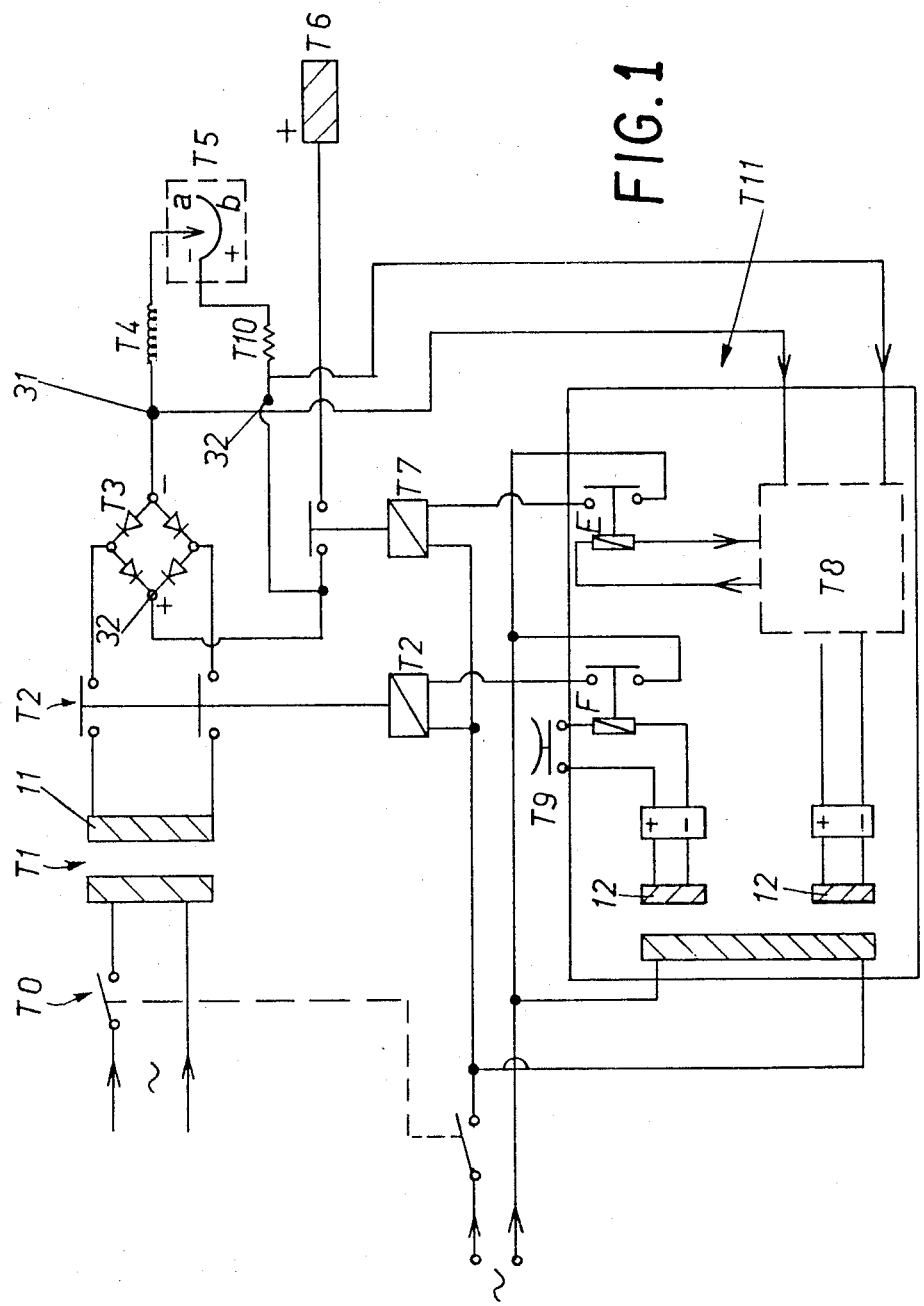

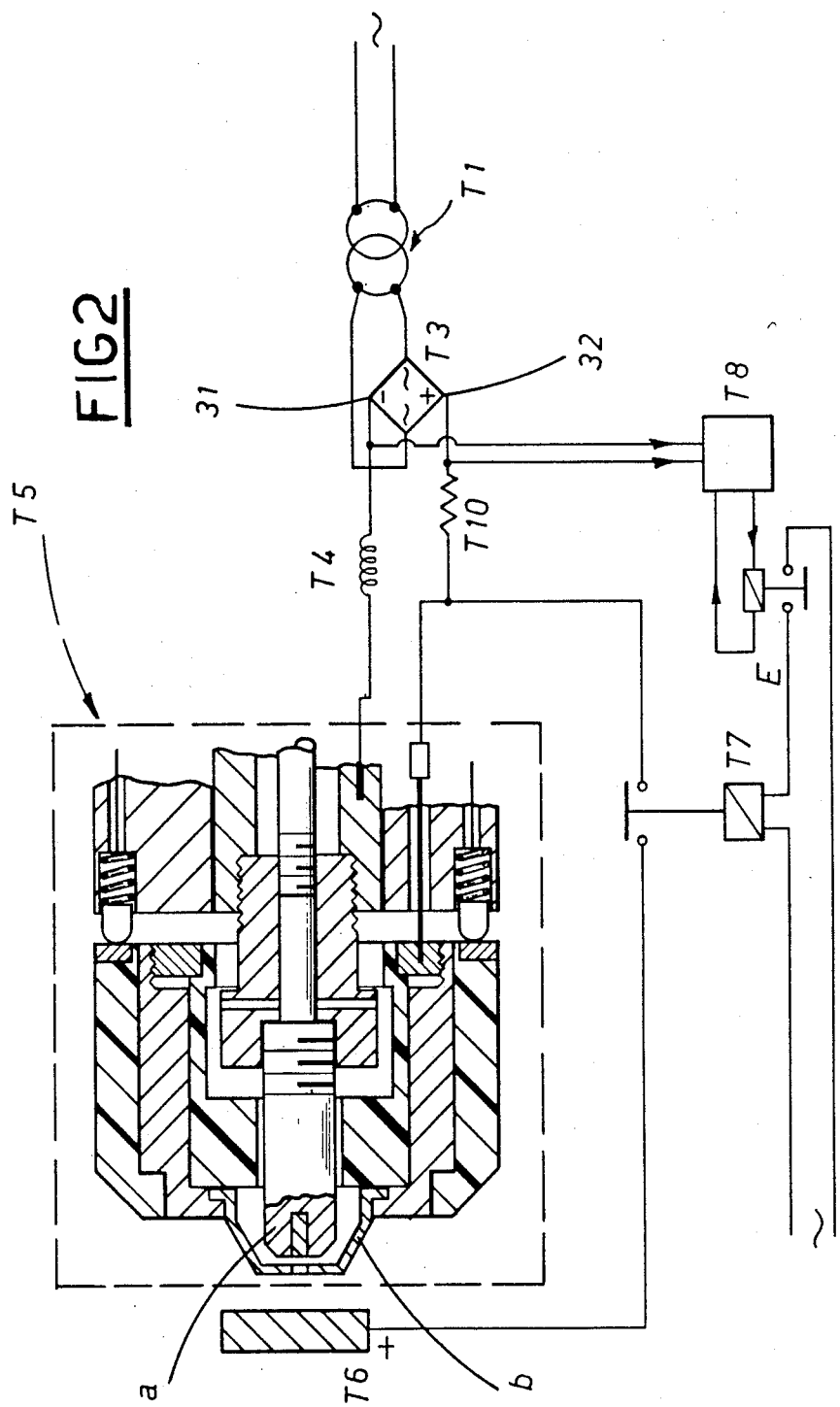

4,814,577

CONTROL CIRCUIT IN PLASMA ARC CUTTING AND WELDING EQUIPMENT DESIGNED FOR TRANSFERRED ARC OPERATION

BACKGROUND OF THE INVENTION

The invention relates to a control circuit forming part of plasma jet power equipment that can be used for transferred arc cutting and welding duties in conjunction with a torch designed basically for non-transferred arc operation.

The prior art embraces designs wherein a cylindrical electrode is attached rigidly to the plasma torch and connected to the negative pole of the electrical power supply by a conductor. In such instances, the anode takes the form of a cap, likewise rigidly attached to the torch, which covers the projecting tip of the electrode. The cap is insulated from the electrode, and connects with the positive pole of the power supply via a second conductor, a fine gap being created between cap and electrode through which plasma-forming gas is directed under pressure toward an orifice in the cap itself; the pierced cap thus constitutes a constricting nozzle. In a first conventional type of torch, an arc is struck between nozzle and electrode utilizing a particularly high auxiliary voltage, which in most instances will be generated by complex, costly high frequency circuitry to which the torch is connected by long, heavily insulated cable.

What occurs, in practice, is that one generates a spark between the electrode and the nozzle, which occupy fixed positions in relation to one another; an arc is struck, and continues to discharge until such time as the torch push button or power supply switch is shut off. Accordingly, the arc is struck between components of the torch, and not transferred to the work.

The expedient widely adopted to permit transferred arc operation of such a torch is that of connecting the work (welding or cutting) to the same positive terminal as that to which the nozzle return lead is connected, and wiring-in a resistance between the return lead and the terminal. Thus, when the torch is moved toward the weld or cut, the arc encounters less resistance from the work than from the return lead, and jumps across to the work.

The same effect can be produced by wiring-in switch contacts, rather than a resistance, which will be broken when the weld or cut is commenced.

In a second conventional type of torch, designed for transferred arc operation, the arc is struck between the electrode and the work; the electrode is rigidly attached to and shielded by the torch and connected to the negative terminal of the power supply, as before, though in this instance it is the work to be welded or cut, and not the nozzle, that is connected to the positive terminal.

The cap, or nozzle, is no longer rigidly attached in this type of torch, and an arc is struck by bringing the nozzle into momentary contact with the electrode and the work, sandwiching it swiftly between the two and then releasing. This physical contact between the electrode, nozzle and work short-circuits power through the torch, whereupon, with the electrode distanced from the nozzle, the gap created between electrode and nozzle produces an arc, and the arc is transferred from the electrode to the work.

It will be appreciated that good initial contact between nozzle and work is a fundamental requirement in plasma welding or cutting with a transferred arc; this in turn dictates that the work must offer a sufficiently clean surface, so that a certain amount of preparation is called for, in particular where there may be rust, old paintwork. Transferred arc equipment must therefore incorporate special safety circuits to prevent high voltage from reaching the electrode unless the electrode itself is faultlessly positioned for operation, that is, in contact with the work; without such a precaution, the high welding voltage would invest the operator, who will normally be in physical contact with the work.

Such a safety feature is set forth in EP No. 159256, which discloses the interposition of a low voltage circuit between the electrode and the work to be welded or cut, or rather, between the two relative terminals, the output signal from which operates a control medium designed to switch the main high voltage circuit into safe condition.

More recently, the same applicant has developed a non-transferred arc torch design in which the fixed electrode (wired to negative as before) is retained, whereas the nozzle (wired to positive) is capable of movement in relation to the electrode between a transitory position, in which contact is occasioned so as to strike the arc (the arc being struck, in reality, immediately following subsequent separation of the two components), and the normal operating position in which the nozzle is distanced from the electrode; once the arc is struck in such a torch, it will continue discharging, non-transferred, until such time as the control button on the grip of the torch is released to break the power circuit.

This design of torch solves the problem of excessive cost besetting the high frequency equipment referred to above, but remains subject to the usual drawbacks of non-transferred arc operation—i.e. a less than perfectly clean cut, especially around the edges, and overheating of the torch itself, and in particular the nozzle, which thus wears out that much earlier.

The object of the invention is that of embodying a control circuit for transferred arc type plasma jet cutting or welding equipment that can be used for both non-transferred and transferred arc operation, thereby gaining the advantages relative to either method.

A further object of the invention is to embody a circuit that will allow of striking an arc initially between electrode and nozzle, and of transferring the arc to the work thereafter as and when required, even in cases where the surface of the work may be rusted, or have undergone treatment at some previous time.

Another object of the invention is that of embodying a circuit which allows a non-transferred arc to be struck in the torch without using high frequency power and enables transferred arc operation of the torch, whilst ensuring the personal safety of the operator in either instance, especially the latter instance.

SUMMARY OF THE INVENTION

The stated objects are achieved with a circuit according to the invention. In the circuit disclosed, the nozzle of the torch is connected to rectified power output by way of a resistor, and use is made of a comparator to sample the output voltage when the torch is switched from stand-by to normal non-transferred arc operation. The comparator will respond only if the voltage sampled is sufficient to sustain an arc, so that subsequent switch-in of the ground line between the work and the power source is enabled only after an arc has first been struck between the electrode and the nozzle.

BRIEF DESCRIPTION OF THE DRAWINGS

The invention will now be described in detail, by way of example, with the aid of the accompanying drawing, in which like items are identified by the same reference designation, where:

FIG. 1 is a block circuit schematic diagram of the embodiment of the invention; and FIG. 2 is a block circuit schematic diagram of one embodiment of the invention, including a partial sectional view or a torch assembly with a movable nozzle.

DESCRIPTION OF THE PREFERRED EMBODIMENT

The various components are symbolized in the drawing as follows:
T0: main power switch
T1: transformer in receipt of a.c. power supply and producing high output voltage;
T2: remote control switch with contacts wired into the high voltage power stage;
T3: full wave rectifier bridge;
T4: choke;
T5: plasma arc cutting/welding torch comprising:
  a—electrode (negative)
  b—nozzle (positive)
T6: work
T7: remote control switch with contacts wired into a positive branch of the power stage (the ground cable) connecting with the work T6;
T8: electronic comparator set to respond to the rectified output from T3 across a given range of voltage (say, 15 ... 60% of stand-by level);
T9: control switch operated by the trigger of the torch;
T10: resistor;
T11: auxiliary stage incorporating T2 and T7.

With reference to FIG. 2, a nozzle structure T5 including a nozzle "B" slidable with respect to an electrode "a" is shown. Also shown is the electrical connection of the nozzle structure T5 to various other circuit elements of FIG. 1. Details of the novel structure T5 are given in applicants' co-pending application Ser. No. 014,486, filed on Feb. 13, 1987, for "Plasma Arc Welding And Cutting Torch". Such description is incorporated in herein by reference.

Operation of the circuit is as follows. First, the main power switch T0 is moved to 'on', in order to obtain high voltage output (say, 280V) from the secondary winding 11 of the power transformer, and low voltage output from the secondary winding 12 of the auxiliary transformer.

The operator takes up the torch and squeezes the trigger in order to operate the control switch T9; this excites a relay denoted F, and the circuit is made to a first remote control switch denoted T2, which energizes. Rectified output voltage is thus available at the terminals 31, 32 of the rectifier bridge T3, and duly supplied to the electrode a and nozzle b of the torch T5.

The operator now presses the tip of the nozzle b against the work T6 to be cut or welded (or against whatever object, conductive or nonconductive), compressing an internal spring by which the nozzle is distanced from the electrode throughout normal operation.

Electrode a and nozzle b are brought into contact momentarily, then allowed to separate, so that an arc is struck between them; the enabling switch T2 being energized, a non-transferred arc will now be sustained until such time as the trigger T9 is released.

Switching from stand-by conditions (with rectified output voltage of, say, 250 ... 260V at terminals 31 and 32, but as yet, no arc struck) to normal operation, a voltage drop occurs at the two terminals 31 and 32; this is detected by a comparator T8 (preferably electronic) forming part of the auxiliary stage T11.

As long as the drop in voltage picked up by the comparator T8 falls within a given range (this will correspond to the levels necessary to sustain an arc, say, 50 . . . 180V), then a relay E is excited, producing energization of a second remote control switch T7, the contacts of which are wired to the ground cable connecting with the work T6.

It will be observed that the circuit thus described permits of operation with either a nontransferred or a transferred arc; this is an option left open to the operator, who simply grounds the work T6 or leaves it disconnected, according to choice.

As long as the work T6 remains isolated from the equipment, the torch will operate in nontransferred arc conditions, in which contact with the work is unimportant; the arc is struck between electrode a and nozzle b, and attention to the state of the cut or welded surface is thus unnecessary.

In the event of the operator wishing to transfer the arc (giving a cleaner cut or weld, producing less wear on torch components, and giving higher power for thicker work), it suffices simply to attach the ground cable to the work T6, whereupon the arc will be transferred by the power stage (when enabled by the second remote switch T7).

In a circuit according to the invention, the arc will be transferred only when safe striking conditions exist, thus ensuring that the operator remains protected; without such a protection, a break in the high voltage lead to the nozzle b, for example, would prevent any spark from being generated, and the operator would be invested with high voltage when pressing the nozzle against the work T6 and coming inevitably into contact with the electrode a.

In the protected circuit disclosed, on the other hand, a break in power supply to the nozzle b will dictate:

that no arc is struck, and the enabling switch T7 controlling the ground cable remains inhibited by the comparator T8;

that in the event of a mishap during cutting or welding, withdrawal of the torch from the work forces the arc between electrode a and nozzle b to extinguish, and the ground cable control switch T7 de-energizes.

Having completed the cut or weld, the operator will release the trigger T9, whereupon the first remote control switch T2 de-energizes and power supply to the torch is cut off.

What is claimed:

1. A control circuit in plasma arc cutting and welding equipment designed for transferred arc operation, comprising:

a torch having a fixed electrode, and a movable nozzle capable of shifting axially in relation to the electrode between a transitory position, in which said electrode and said nozzle are brought into contact to close the power circuit and strike an arc, and an operating position in which the nozzle is distanced from the electrode and the arc is sustained, a power transformer connected to a rectifier bridge, the latter having first and second output terminals of which are connected the first to said electrode and the second, by a resistor wired to said nozzle and, by a switch to a workpiece to be cut or welded, the said power transformer passing from a stand-by condition corresponding to the distancing between said electrode and said nozzle to a normal operation condition in which said electrode contacts said nozzle, and detecting means wired to the said output terminals of the rectifier bridge for detecting the change from said stand-by to said normal operation condition to enable said switch only after the arc has been struck, for permitting operation of said switch to connect said second terminal to said workpiece.

2. Circuit as in claim 1, comprising a remote control switch wired to enable and inhibit power input to the rectifier bridge, hence to enable and inhibit power output, said switch is maintained in closed position throughout normal operation of the torch by depressing a push button switch on which the torch trigger impinges.

3. Circuit as in claim 1, wherein means wired to the rectified output voltage terminals consist of a comparator in direct receipt of the output from the terminals of the rectifier bridge, the function of which is to sample the rectified output voltage and, in the event of its falling within a given range corresponding to that of arcing voltage, to enable excitation of a switching component wired in series to that branch of the power circuit by which the work for cutting or welding is grounded to the relative terminal.

* * * * *